Patented Aug. 5, 1952

2,606,155

UNITED STATES PATENT OFFICE 2,606,155

CLEANING AND PICKLING COMPOSITION FOR METALS

William H. Hill, Pittsburgh, Pa., assignor to Koppers Company, Inc., Pittsburgh, Pa., a corporation of Delaware No Drawing. Application November 26, 1946, Serial No. 712,253

4 Claims. (Cl. 252—149)

This invention relates to compositions of matter and is particularly directed to products of the condensation of an aldehyde and a preformed salt of a thiocyanic acid and certain nitrogen compounds.

The new products of the invention are useful as inhibitors in cleaning metals, as more particularly set forth in U. S. Patent No. 2,425,320, granted August 12, 1947, on my copending application, Serial No. 463,133, filed October 23, 1942, of which the present application is in part a continuation; as rubber accelerators; as pest control agents; and as synthetic resins and plastics.

The nitrogen compounds from which the salts of thiocyanic acids are prepared are basic heterocyclic amino compounds. They contain one or more amino or imino groups, or tertiary or quaternary nitrogen atoms, or combinations thereof in which the amino nitrogen atom is an element of a heterocycle. It is to be understood in the present instance that the term "heterocyclic amino compound" as herein employed, applies to compounds containing secondary, tertiary and quaternary amine structures in their configuration and wherein two or three atoms of ammonia hydrogen have been replaced by other linkages.

The stronger the basic characteristics of the amino compound used as a starting material the better the compound is for purposes of the present invention. It is preferred that the amino compound be basic enough to form with thiocyanic acid true thiocyanates of sufficient stability to avoid continuous splitting off of free thiocyanic acid in too great proportions during condensation. The bases employed should preferably have a basicity greater than that expressed by the dissociation constant 10—14.

The presence of water solubilizing groups, such as NH$_2$, NH, OH and others, in the amino compound or in the inhibitor product confers upon the inhibitor increased solubility in the acid baths in which it is used.

In particular the invention is directed to condensation products of an aldehyde and preformed heterocyclic ammonium salt of a thiocyanic acid. The latter compounds may be graphically illustrated by the following structure:

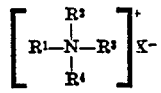

in which $R^1$, $R^2$, $R^3$ and $R^4$ are the radicals of an ammonium ion and at least two are linked together to form a heterocycle with the nitrogen atom, and X is the anion of a thiocyanic acid.

The following are some of the amino compounds which have been found to be useful in providing the acid inhibitors of the present invention:

Pyridine, alpha-picoline, 2,6-lutidine, quinoline, quinaldine, nicotine, piperidine, morpholine, morpholine biguanid, phenylmorpholine, and phenylmethyl pyrazolone, cyclic amidines such as melamine, formoguanamine, acetoguanamine, melam, melem, 2,4,6-trihydrazino-1,3,5-triazine.

The above amino compounds, either singly or mixtures of two or more thereof, or in admixture with other basic amino compounds are readily converted to salts of a thiocyanic acid (e. g. thiocyanic acid, or perthiocyanic acid) by reaction with the thiocyanic acid or by the double decomposition of another amine salt and a metal or ammonium salt of the thiocyanic acid.

For the aldehyde component of the new compounds there may be used for example formaldehyde, acetaldehyde, butyraldehyde, crotonaldehyde, acrolein, benzaldehyde, salicylaldehyde, cinnamic aldehyde, furfural, glyoxal, and others and mixtures thereof. Formaldehyde is in general to be preferred on account of its availability, cheapness, and effectiveness.

As to the relative proportion of amino compound and aldehyde to be used, no general rule can be laid down. The ratio depends on the number of active groups in the amino compound molecule, such as NH$_2$ and thiocyanate groups. One mol of aldehyde is usually employed for each reactive group, and therefore in most cases two mols of aldehyde are sufficient for a particular thiocyanate. In using the products for pickling inhibitors, however, an excess of, for example, formaldehyde does no harm, since it is in itself a pickling inhibitor of some limited value and may therefore be left with the reaction product in many cases. A deficiency of aldehyde also is of no grave consequence if the products are used as inhibitors, since practically all amines and thiocyanates in a sense have some inhibiting value of their own. Where desired, an excess of aldehyde may be removed by means known to the art, such as evaporation in vacuo or otherwise.

When using the products as pickling inhibitors, it is often advantageous to add wetting agents to the pickling baths or to incorporate such agents with the inhibitors themselves. Such commercial wetting agents as a naphthalene sulphonic acid type of wetting agent, known as Aerosol OS, render good service. They should be employed in quantities of about ½% of the acid weight of the bath. The addition of wetting agents facilitates the removal of carbon smut from pickled steel or other metal goods. At the same time, though only very small amounts of the inhibitors are needed in a pickling bath in order to inhibit effectively the solvent action of the acid in the bath on the metal as seen in the following examples, the addition of the wetting agent increases the effectiveness of the inhibitors to such an extent that substantially smaller percentages of the inhibitors give satisfactory results.

The following examples, in which the parts are by weight unless otherwise specified, are illustrative.

Example 1

69 g. (0.5 mol) of pyridine thiocyanate is mixed with 75 cc. (1 mol) of 40% aqueous formalin solution. Almost all of the thiocyanate salt goes into solution, the latter cooling down appreciably in the process. The mixture is heated to boiling under a reflux condenser for three hours. No solid separates out and the liquid is of light yellow color. Evaporation yields a light brown solid.

Example 2

76 g. of alpha-picoline thiocyanate (0.5 mol) is mixed with 75 cc. (1 mol) of 40% aqueous formalin solution. The resultant light yellow liquid is refluxed for two hours under a reflux condenser. Evaporation of the condensation product on a steam bath yields a gray-white brittle solid.

Example 3

83 g. (0.5 mol) of 2,6-lutidine thiocyanate is mixed with 75 cc. (1 mol) of 40% aqueous formalin solution. The thiocyanate dissolves completely at room temperature with absorption of heat. The resulting yellow liquid is gently refluxed for two hours and is then evaporated on a steam bath yielding a red granular solid.

Example 4

94 g. (0.5 mol) of quinoline thiocyanate is mixed with 75 cc. (1 mol) of 40% aqueous formalin solution. Most of the thiocyanate goes into solution with absorption of heat and the rest dissolves when the mixture is refluxed for three hours. The resultant red-brown liquid is evaporated on the steam bath, yielding a red-brown solid.

Example 5

202 g. (1 mol) of quinaldine thiocyanate is mixed with 150 cc. (2 mols) of 40% aqueous formalin solution. The thiocyanate salt dissolves easily and the resultant solution is light red in color. It is refluxed gently for five hours and is then evaporated to yield an almost black solid.

Example 6

88.4 g. (0.4 mol) of nicotine thiocyanate is mixed with 75 cc. (1 mol) of 40% aqueous formalin solution. The dark brown liquid is refluxed for two hours. Evaporation on a steam bath yields a dark, syrupy liquid.

Example 7

146 g. (1 mol) of morpholine thiocyanate is mixed with 150 cc. (2 mols) of 40% aqueous formalin solution. The salt dissolves to a large extent and goes completely into solution during the subsequent heating under reflux for five hours. The condensation product is evaporated to near dryness and then constitutes a dark brown, viscous, oily liquid.

Example 8

202 g. of the thiocyanic acid salts of quinoline still residue bases (mixed tar bases of average molecular weight 143), constituting a viscous, dark-brown liquid, is mixed with 150 cc. of 40% aqueous formalin solution. The two liquids mix easily. The mixture is refluxed for two hours. The almost black, viscous reaction product is evaporated to a black, viscous liquid.

While in the foregoing examples the condensation products were evaporated in order to eliminate ballast water and possibly excess formaldehyde, this is not necessary. The products at the end of the condensation period may be used as such as pickling inhibitors.

Example 9

185 parts by weight of mixed triazine thiocyanates containing the thiocyanates of melamine, melam, melem, and melon and obtained by thermal decomposition of ammonium thiocyanate, are reacted with 225 parts of 40% aqueous formaldehyde by heating the mixture to just under the boiling point. On cooling, the turbid, light tan solution sets to a solid, which is soluble in acid and does not melt at temperatures up to 300° C. but commences to turn brown at about 260° C.

Example 10

46 g. (0.25 mol) melamine monothiocyanate was reacted with 60 grams 40% aqueous formalin solution (0.75 mol plus 3 g.) in a round bottom flask on the reflux. The initially thick slurry gradually thinned out and when a temperature of about 50° C. was reached, the mixture turned yellow and became almost clear whereupon the reaction proceeded with strong evolution of heat and with frothing and bubbling until a cellular froth had filled the flask and extended even a little into the condenser. After cooling, the solid product was ground to a fine powder.

I claim:

1. A cleaning and pickling composition for metal subject to atmospheric corrosion and for removing oxides and other corrosion products from surfaces of said metal, said composition comprising a pickling acid solution having dissolved therein a relatively small proportion of a reaction product of an aldehyde and a preformed thiocyanate of a basic amino compound having the formula

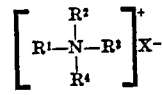

in which $R^1$, $R^2$, $R^3$ and $R^4$ are radicals of an ammonium ion and at least two are linked together to form a heterocycle with the nitrogen atom and X is the anion of a thiocyanic acid, said reaction product being soluble in said pickling acid solution in a proportion which inhibits dissolution of said metal by said acid.

2. In a method of cleaning and pickling a metal, the step comprising treating the metal with an aqueous pickling acid solution in which is dissolved in acid-inhibiting proportions a product of reaction between an aldehyde and a preformed thiocyanate of a basic amino compound having the formula

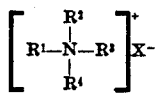

in which $R^1$, $R^2$, $R^3$ and $R^4$ are radicals of an ammonium ion and at least two are linked together to form a heterocycle with the nitrogen atom and X is the anion of a thiocyanic acid to inhibit dissolution of said metal by said pickling acid.

3. A cleaning and pickling composition for metal subject to atmospheric corrosion and for removing oxides and other corrosion products from surfaces of said metal, said composition comprising a pickling acid solution having dissolved therein a relatively small proportion of a reaction product of formaldehyde and a preformed thiocyanate of a basic amino compound having the formula

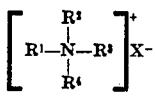

in which $R^1$, $R^2$, $R^3$ and $R^4$ are radicals of an ammonium ion and at least two are linked together to form a heterocycle with the nitrogen atom and X is the anion of thiocyanic acid, said reaction product being soluble in said pickling acid solution in a proportion which inhibits dissolution of said metal by said acid.

4. In a method of cleaning and pickling a metal, the step comprising treating the metal with an aqueous pickling acid solution in which is dissolved in acid-inhibiting proportions a product of reaction between formaldehyde and a preformed thiocyanate of a basic amino compound having the formula

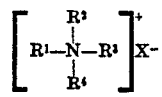

in which $R^1$, $R^2$, $R^3$ and $R^4$ are radicals of an ammonium ion and at least two are linked together to form a heterocycle with the nitrogen atom and X is the anion of thiocyanic acid to inhibit dissolution of said metal by said pickling acid.

WILLIAM H. HILL.

REFERENCES CITED

The following references are of record in the file of this patent:

UNITED STATES PATENTS

| Number | Name | Date |
|---|---|---|
| 1,780,636 | Stine | Nov. 4, 1930 |
| 2,053,850 | Sturken | Sept. 8, 1936 |
| 2,165,852 | Harmon et al. | July 11, 1939 |
| 2,217,667 | Bruson | Oct. 15, 1940 |
| 2,287,756 | Brookes | June 23, 1942 |
| 2,325,105 | Bruson | July 27, 1943 |
| 2,335,452 | Schelling | Nov. 30, 1943 |
| 2,345,456 | Bruson | Mar. 28, 1944 |
| 2,368,451 | D'Alelio | Jan. 30, 1945 |
| 2,412,984 | Hill | Dec. 24, 1946 |
| 2,425,320 | Hill | Aug. 12, 1947 |

FOREIGN PATENTS

| Number | Country | Date |
|---|---|---|
| 534,698 | Great Britain | Mar. 14, 1941 |